United States Patent
Andres (10) Patent No.: US 9,909,823 B2
(45) Date of Patent: Mar. 6, 2018

(54) THERMAL CONDUCTIVITY CONTROL DEVICES

(71) Applicant: Michael J. Andres, Roscoe, IL (US)

(72) Inventor: Michael J. Andres, Roscoe, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 1049 days.

(21) Appl. No.: 13/913,863

(22) Filed: Jun. 10, 2013

(65) Prior Publication Data

US 2014/0363718 A1 Dec. 11, 2014

(51) Int. Cl.

| | |
|---|---|
| *G05D 23/02* | (2006.01) |
| *H01M 10/63* | (2014.01) |
| *F28F 13/00* | (2006.01) |
| *H01M 10/6551* | (2014.01) |
| *H01M 10/6554* | (2014.01) |
| *H01M 10/613* | (2014.01) |
| *H01M 10/625* | (2014.01) |
| *H01M 10/655* | (2014.01) |
| *F28D 21/00* | (2006.01) |

(52) U.S. Cl.
CPC ........... *F28F 13/00* (2013.01); *G05D 23/021* (2013.01); *H01M 10/613* (2015.04); *H01M 10/6551* (2015.04); *H01M 10/6554* (2015.04); *F28D 2021/0021* (2013.01); *F28D 2021/0043* (2013.01); *F28F 2013/008* (2013.01); *H01M 10/625* (2015.04); *H01M 10/655* (2015.04); *H01M 2220/20* (2013.01)

(58) Field of Classification Search
None
See application file for complete search history.

(56) References Cited

U.S. PATENT DOCUMENTS 4,450,687 A * 5/1984 Cole .................... G05D 23/021
                                                            236/101 R
2010/0062321 A1 3/2010 Nakamura

FOREIGN PATENT DOCUMENTS

| EP | 1 394890 A2 | 3/2004 | |
| EP | 1394890 A2 * | 3/2004 | ............. G05D 23/08 |
| EP | 1798624 A2 * | 6/2007 | ............. F28F 13/00 |

(Continued)

OTHER PUBLICATIONS

Search Report and Opinion in European Patent Application No. 14 171 727.2 dated Nov. 19, 2014.

*Primary Examiner* — Barbara Gilliam
*Assistant Examiner* — Adam A Arciero
(74) *Attorney, Agent, or Firm* — Locke Lord LLP; Scott D. Wofsy; Christopher J. Cillié

(57) ABSTRACT

A system for controlling thermal conductivity between two thermal masses is disclosed. The system includes a first conduction body in thermal contact with a heat source and a second conduction body in contact with a heat sink. A thermal expansion component operatively connects to the first conduction body and moves the body between first and second positions at a predetermined temperature. In the first position the first conduction body is spaced apart from the second conduction body, thermally isolating the heat source from the heat sink. In the second position the first conduction body thermally contacts the second conduction body, and conducts heat from the heat source, through the conduction bodies and into the heat sink. Related methods are also described.

15 Claims, 3 Drawing Sheets

(56) References Cited

FOREIGN PATENT DOCUMENTS

| | | | | |
|---|---|---|---|---|
| EP | 1798624 A2 | 6/2007 | | |
| EP | 2355204 A1 * | 8/2011 | .......... | H01M 2/1016 |
| EP | 2355204 A1 | 8/2011 | | |
| WO | WO 2013054327 A2 * | 4/2013 | ......... | H05K 7/20545 |
| WO | WO-2013054327 A2 | 4/2013 | | |

* cited by examiner

THERMAL CONDUCTIVITY CONTROL DEVICES

BACKGROUND OF THE INVENTION

1. Field of the Invention

The present invention relates to thermal conductivity control devices, and more particularly, to thermal conductivity control devices that reduce the heat transfer rate from a heat source to a heat sink below a predetermined temperature.

2. Description of Related Art

Vehicles rely on batteries for power when power is not available from onboard electrical generators or an external source. Typically, vehicles have used conventional batteries with lead-acid cells or nickel-cadmium cells to meet onboard power needs when onboard generators and external sources are not available. Developments in vehicle systems have led to greater power requirements, and vehicle designers have therefore turned to high energy chemistry batteries for vehicular power storage. Lithium metal and lithium ion chemistry batteries, such as lithium cobalt oxide, have gained widespread acceptance in vehicular applications owing to their relatively small size and weight for a given amount of power storage. High energy chemistry batteries are desirable in automotive and aerospace applications because of their high energy density relative to conventional battery chemistries, such as nickel cadmium or lead acid chemistries.

High energy batteries generate power through an exothermic reaction. The heat generated by the exothermic reaction needs to be dissipated from the battery. Vehicles therefore typically include a thermally efficient conduit coupling the battery to the environment external to the vehicle to dissipate heat while the battery is in operation. High energy batteries can also have a minimum operating temperature below which battery performance degrades. They therefore rely on internally generated heat or a battery powered external heating element to maintain the temperature of the battery above a minimum operating temperature. However, under certain conditions, the highly efficient conduit used to cool the battery during operation also dissipates heat generated to keep the battery above its minimum operating temperature, thereby reducing available battery power and/or reducing battery life. Vehicles operating in cold ambient temperature environments are particularly susceptible to this problem.

Conventional methods and system for battery cooling have generally been considered satisfactory for their intended purpose. However, there is a need in the art for a thermal conductivity control device capable of reducing conduction path effectiveness during operation in cold ambient temperature environments. There is a further need for controlling thermal conductivity effectiveness in cold ambient temperature environments that is easy to make and use, and readily adaptable for use in existing battery installations. The present invention provides a solution for at least one of these needs.

SUMMARY OF THE INVENTION

The subject invention is directed to a new and useful system for controlling thermal conductivity between two thermal masses. The system includes a first conduction body configured and adapted for thermal contact with a heat source and a second conduction body configured and adapted for thermal contact with a heat sink. The system also includes a thermal expansion component operatively connected to move the first conduction body between a first position in which the first conduction body is spaced apart from the second conduction body for thermal isolation of the heat source and heat sink, and a second position in which the first conduction body is in thermal contact with the second conduction body for conduction of heat from the heat source, through the conduction bodies, and into the heat sink. The thermal expansion component is configured and adapted to move the first conduction body into the second position at a predetermined temperature.

In certain embodiments the first and second positions of the first conduction body define a direction of motion of the first conduction body with respect to the second conduction body. The conduction bodies can also have a wedge face oblique with respect to the direction of motion of the first conduction body. The wedge faces of conduction bodies can oppose one another, and in certain embodiments, can define an insulating gap between the bodies when the first conduction body is in its first position. The wedge faces can further form a thermally conductive interface when the first conduction body is in its second position. In an embodiment, at least one of the wedge faces is smooth and can be a polished surface for example.

In certain embodiments the thermal expansion component can include a cylinder configured to remain stationary relative to the second conduction body. A piston body operatively connects the first conduction body to the cylinder. The thermal expansion component can also include a thermal expansion body within the cylinder. The thermal expansion body is disposed between the cylinder and the piston, and upon reaching a predetermined temperature, expands to drive the first conduction body in the direction of motion from its first position to its second position. The thermal expansion body can further apply pressure to the opposing wedge faces defining the interface in the second position. The thermal expansion body can be a paraffin wax pellet, for example.

In accordance with certain embodiments the system can also include a resilient member that biases the first conduction body towards the first position. The resilient member can include a spring fixed on a first end to the cylinder and fixed to the piston on another end, for example. The invention also provides a battery system. The system includes a battery body for storing and supplying electrical energy, a first conduction body in thermal contact with the battery body, and a thermal expansion component. The thermal expansion component operatively connects to the first conduction body and moves the first conduction body between a first position and a second position at a predetermined temperature. In the first position the first conduction body is spaced apart from a second conduction body, and thermally isolating the battery body from a heat sink in thermal contact with the second conduction body. In the second position the first conduction body thermally contacts the second conduction body and conducts heat from the battery body, through the conduction bodies, and into the heat sink. In certain embodiments the heat sink is thermally communicative with an exterior of an aircraft or an aircraft fuel reservoir.

The invention also provides a method for controlling thermal conductivity between thermal masses. The method includes contacting a heat source with a first conduction body, contacting a heat sink with a second conduction body, and conducting heat between the heat source and heat sink through the conduction bodies by thermally contacting the second conduction body with the first conduction body. First and second are placed into thermal contact by operation of a thermal expansion component, which moves the first conduction body between first and second positions at a predetermined temperature.

In an embodiment, the method also includes compressing the first conduction body against second conduction body, thereby increasing a rate of heat transfer between the heat source and the heat sink. In an exemplary embodiment, placing the bodies into thermal contact additionally includes sensing temperature of the heat source with the thermal expansion component, such as by volumetrically expanding a thermal expansion body captive within the thermal expansion component.

These and other features of the systems and methods of the subject invention will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION OF THE PREFERRED EMBODIMENTS

Figure 1:
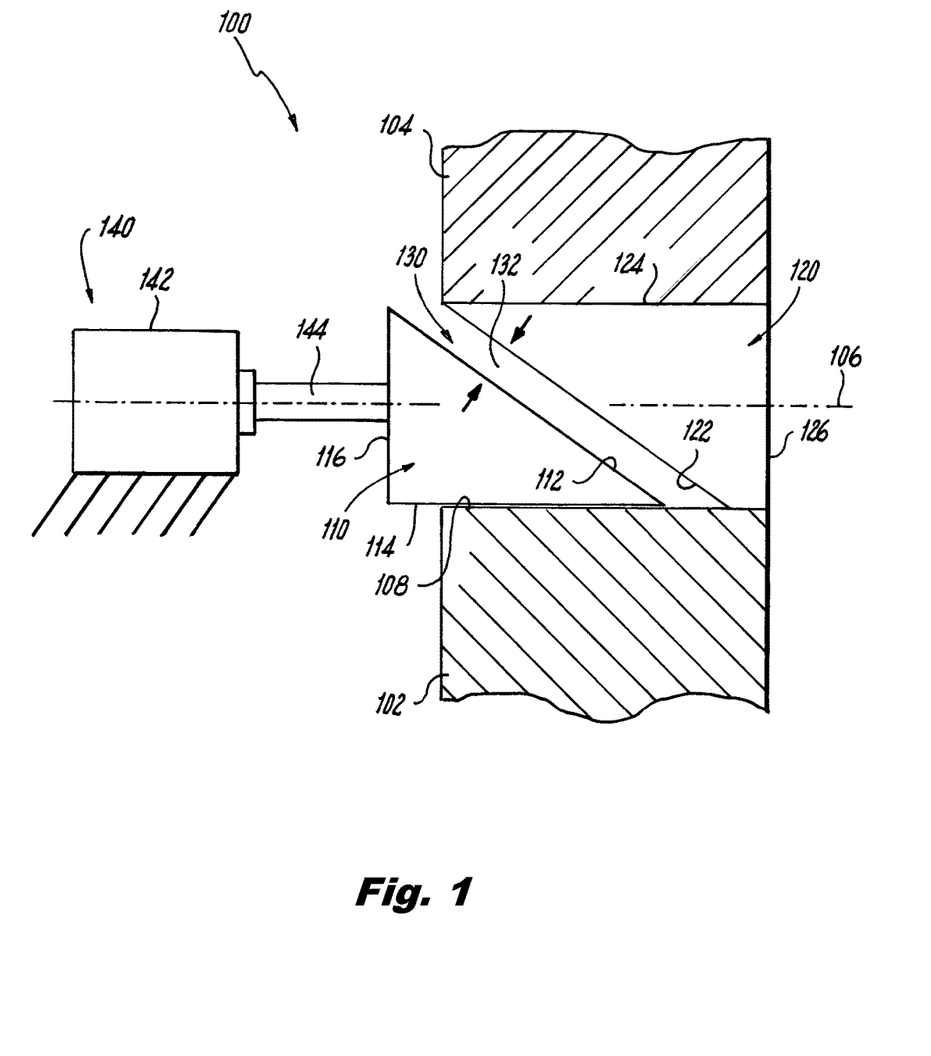
FIG. 1 is a schematic cross-sectional elevation view of an exemplary embodiment of a thermal conductivity control system constructed in accordance with the invention.

Reference will now be made to the drawings wherein like reference numerals identify similar structural features or aspects of the subject invention. For purposes of explanation and illustration, and not limitation, a partial view of an exemplary embodiment of the thermal conductivity control system in accordance with the invention is shown in FIG. 1 and is designated generally by reference character 100. Other embodiments of the thermal conductivity system in accordance with the invention, or aspects thereof, are provided in FIG. 2 and FIG. 3, as will be described. System 100 can be used for dissipating heat from high energy power storage devices, for example, and in vehicles operated in cold ambient temperature environments.

Referring now to FIG. 1, a thermal conductivity control system 100 is shown. Thermal conductivity control system 100 has a first conduction body 110 and a second conduction body 120. First conduction body 110 is slideably disposed on a surface of a first thermal element 102. Second conduction body 120 is fixed to a surface 124 of a second thermal element 104. In an embodiment, first thermal element 102 is a heat source and second thermal element 104 is a heat sink. For example, first thermal element 102 can be a battery and second thermal element can be a heat sink thermally communicative with an aircraft exterior.

First conduction body 110 defines a wedge face 112, a source face 114 adjacent wedge face 112, and a distal face 116 adjacent to wedge face 112 and to source face 114. First conduction body 110 is slideably disposed on surface 108 of first thermal body 102 along a portion of source face 114. System 100 can also include a thermally conductive lubricant disposed between the source face 114 and surface 108, thereby reducing friction between face 114 and surface 106 and providing thermal coupling during movement of face 114 across surface 106.

Second conduction body 120 has a wedge face 122 opposite wedge face 112 of first conduction body 110, a sink face 124 adjacent to wedge face 122, and a distal face 126 adjacent to wedge face 122 and sink face 124. Sink face 124 is configured and arranged to conduct heat into second thermal mass 104, thereby transferring heat from second conduction body 120. First and second conduction bodies 110 and 120 define a movement axis 106, shown in FIG. 1 extending to the right in the figure, axis 106 being substantially parallel to surface 108. In an exemplary embodiment, first and second conduction bodies 110 and 120 are constructed from a material with a high heat transfer coefficient such as copper or aluminum.

Oppositely disposed wedge faces 112 and 122 are substantially parallel to one another, and define a gap 130 therebetween. Gap 130 extends between first and second conduction bodies 110 and 120 and has a width 132. Gap width 132 extends orthogonally with respect to surfaces defined by wedge faces 112 and 122, and defines an insulating barrier between first and second conduction bodies 110 and 120. Gap 130 reduces the efficiency of a thermal conduit defined by first and second conduction bodies 110 and 120 such that heat transfers between bodies 110 and 120 is greatly reduced in the first position with gap 130 at a maximum. Gap 130 can be an evacuated space, an air gap, or an insulating fluid-filled reservoir. As will be appreciated, the thermal effectiveness of the conduction conduit defined by bodies 110 and 120 is influenced by both gap width 132 and the material (if any) disposed within gap 130.

With further reference to FIG. 1, system 100 also includes a thermal expansion component 140. Thermal expansion component 140 includes a fixed element 142 and a movable element 144. Thermal expansion component 140 is in thermal communication with heat source 102 and is operably coupled to first conduction body 110 at distal face 116. Movable element 144 extends from fixed element 142 in the direction of a movement axis 106, and can vary in connecting length based on the temperature of thermal expansion component 140. Movement axis 106 defines a direction of movement of first conduction body 110 with respect to second conduction body 120, and wedge faces 112 and 122 are oblique with respect to movement axis 106. Component 140 is operable to displace first conduction body 110 by sliding body 110 across first thermal body 102 in the direction of movement axis 106. Second conduction body 120 is fixed with respect to movable element 144, so displacement of first conduction body 110 by movable element 144 changes the positional relationship between wedge faces 112 and 122 by increasing or decreasing gap width 132. As will be appreciated, other arrangements of conduction bodies 110 and 120 and thermal expansion component 140 are within the scope of the present invention. For example, first conduction body 110 may be fixed to first thermal body 102, and second conduction body 120 may be operably coupled to thermal expansion component 140 so as to slide across a surface of second thermal body 104. Alternatively, each of first and second conduction bodies 110 and 120 may be movable with respect to thermal bodies 102 and 104, and one or more thermal expansion components 140 can be operably coupled to both body 110 and 120.

Figure 2A:
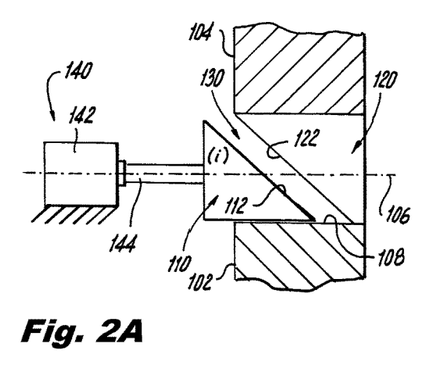
FIGS. 2A-2F are schematic cross-sectional elevation views of the thermal conductivity control device of FIG. 1, respectively showing a sequence of operational position.

Referring now to FIGS. 2A-2F, system 100 is shown in a sequence of configurations in accordance with the present invention. Referring to FIG. 2A, first conduction body 110 is shown in position (i). In position (i), gap 130 has a width (i) and conduction bodies 110 and 120 define a thermal conduit with a heat transfer coefficient (i). In the illustrated configuration first and second bodies 110 and 120 define a low efficiency thermal conduit that allows substantially no conductive heat transfer across gap 130.

Figure 2B:
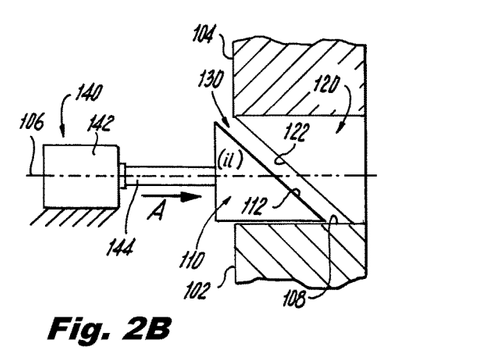

Referring to FIG. 2B, first conduction body 110 is shown in position (ii). First conduction body 110 moves from position (i) to position (ii) by operation of thermal expansion component 140, component 140 displacing conduction body 110 by applying a force A to the distal face 116 of body 110. Force A displaces first conduction body 110 across surface 108 of first thermal body 110 by pushing body 110 toward body 120 along movement axis 106. Force A urges first conduction body 110 across surface 108 of first thermal body 110, displacing body 110 from position (i) to position (ii) and narrowing gap 130. In the illustrated configuration, gap 130 has a width (ii) and conduction bodies 110 and 120 define a thermal conduit with a heat transfer coefficient of (ii). Width (ii) is smaller than width (i) and heat transfer coefficient (ii) is substantially equal to heat transfer coefficient (i).

Figure 2C:
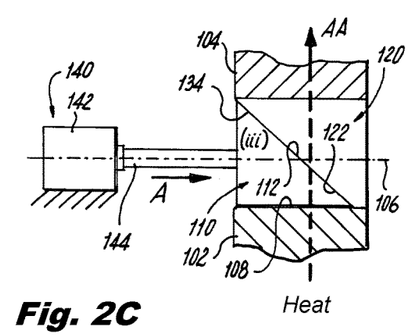

Referring to FIG. 2C, first conduction body 110 is shown in position (iii). Body 110 moves from position (ii) to position (iii) from continued application of force on first conduction body 110 by thermal expansion component 140, as described above. Thermal expansion component 140 moves the first conduction body into position (iii) at a predetermined temperature. In position (iii), displacement of body 110 causes wedge faces 112 and 122 to come into thermal contact, thereby eliminating gap 130 with a mechanical interface 134 extending between bodies 110 and 120. First conduction body 110, interface 134, and second conduction body 120 define a thermally efficient conduit with a heat transfer coefficient of (iii) that allows a flow of heat AA to move across the conduit. In the illustrated embodiment, heat transfer coefficient (iii) is greater than heat transfer coefficients (i) and (ii). In an exemplary embodiment, heat transfer coefficient (iii) is smaller than the heat transfer coefficient of the material(s) from which bodies 110 and 120 are constructed due to the thermal contact resistance across interface 134.

Figure 2D:
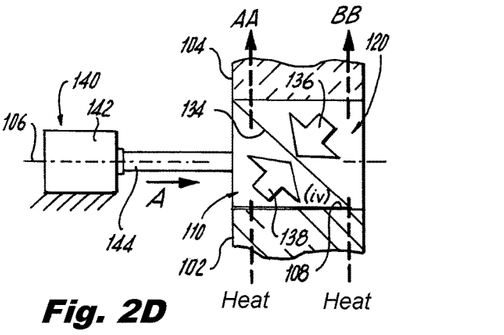

Referring to FIG. 2D, first conduction body 110 is shown in position (iv). Position (iv) is similar to position (iii), and additionally includes compressive forces 136 and 138 applied at the respective wedge faces. Thermal expansion component 140 can optionally apply additional force on first conduction body 110 in position (ii), thereby urging wedge face 112 against wedge face 122. Since wedge face 122 is fixed, force A presses wedge face 112 against wedge face 122, inducing a compressive force 136 on face 112 and compressive force 138 on wedge face 122. Compressive forces 136 and 138 cause interface 134 to conduct heat relatively efficiently, and render system 100 a more effective heat conduit. The heat transfer conduit defined by first and second conduction bodies 110 and 120 therefore has a heat transfer coefficient (iv) that is greater than heat transfer coefficient (iii). Thermal expansion component 140 moves the first conduction body 110 into configuration (iv) at a predetermined temperature. In the illustrated embodiment, coefficient (iv) approaches that of the material(s) from which first and second conduction bodies 110 and 120 are constructed. Wedge faces 112 and 122 can be polished or lapped surfaces, thereby facilitating heat transfer across the faces when in contact with one another.

Figure 2E:
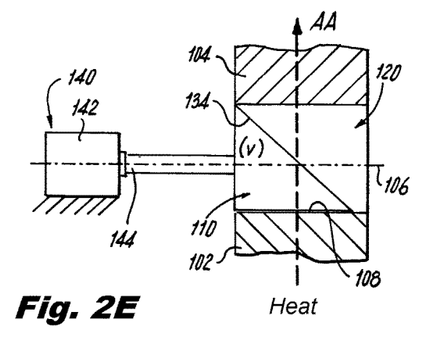

Referring to FIG. 2E, first conduction body 110 is shown in position (v). Position (v) is similar to positions (iii) and (iv) absent the application of compressive forces on the opposed wedge faces. Wedge faces 112 and 122 remain in mechanical contact but no longer exert compressive forces on the opposing faces. First and second conduction bodies 110 and 120 define a heat transfer conduit with a heat transfer coefficient (v). In the illustrated embodiment, heat transfer coefficient (v) is substantially the same as heat transfer coefficient (iii).

Figure 2F:
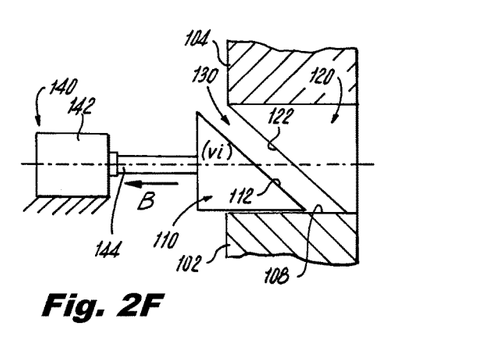

Referring to FIG. 2F, first conduction body 110 is in a position (vi). First conduction body 110 moves from position (v) to position (vi) by operation of thermal expansion component 140, component 140 displacing conduction body 110 by applying a force B to the distal face 116 of body 110. Force B displaces first conduction body 110 across first thermal body 110 by pulling body 110 toward component 140 along movement axis 106. Displacement of body 110 from position (v) to position (vi) isolates wedge face 112 from wedge face 122 by re-establishing gap 130. Gap 130 renders the heat transfer conduit defined by first and second conduction bodies 110 and 120 less effective than that of position (v). In the illustrated configuration bodies 110 and 120 define a heat transfer coefficient (vi) that is substantially equal to above-described heat transfer coefficient (i and ii). As will be appreciated, heat can transfer both by conduction and radiation. Embodiments described herein greater amounts of heat by conduction than by radiation at common ambient temperatures, such as below 120° Fahrenheit for example. At greater temperatures a larger amount of heat can be transferred by radiation than by conduction.

Operatively, system 100 controls thermal conductivity between thermal bodies 102 and 104 by (a) thermally contacting first conduction body 110 with thermal body 102; (b) thermally contacting second conduction body 120 with thermal body 104; (c) thermally contacting second conduction body 120 with first conduction body 110 by moving body 110 between a first position using thermal expansion component 140; and (d) conducting heat from thermal body 102 to thermal body 104 across bodies 110 and 120. As will be appreciated, first body 102 can be a heat source and second body 104 can be a heat sink. As will also be appreciated, first position can be as illustrated in FIG. 2A or FIG. 2B and second position can be as illustrated in FIG. 2C or FIG. 2D. As will additionally be appreciated, conducting heat can be as illustrated in FIG. 2C, FIG. 2D, or FIG. 2E. The method can optionally include (e) compressing first conduction body against second conduction body, thereby increasing a rate of heat transfer between the heat source and the heat sink. Advantageously, embodiments of the method wherein further pressure is applied across positionally fixed bodies 110 and 120 increases heat transfer across the bodies owing to opposing compressive forces applied at the contacting faces of the bodies.

Thermal expansion component 140 thermally moves bodies 110 and 120 upon reaching a predetermined temperature, as described above. Component 140 can operate by volumetrically expanding a thermal expansion body captive within component 140, such as a wax ball or like element that undergoes a significant volumetric expansion, e.g. about a 10% volumetric expansion, in response to temperature change. As will be appreciated, a phase change may accompany the volumetric expansion, such as from solid to liquid, liquid to gas, or solid to gas. Alternatively, component 140 can be operable through a thermal expansion component that changes shape as result of thermal expansion, such a bimetal plate that exhibits a greater amount of bow at a predetermined temperature. The bowing of such a bimetal plate would operate to drive first conduction body axially, along axis 106, at the predetermined temperature. The bimetal plate can be a snap disk, for example.

Figure 3A:
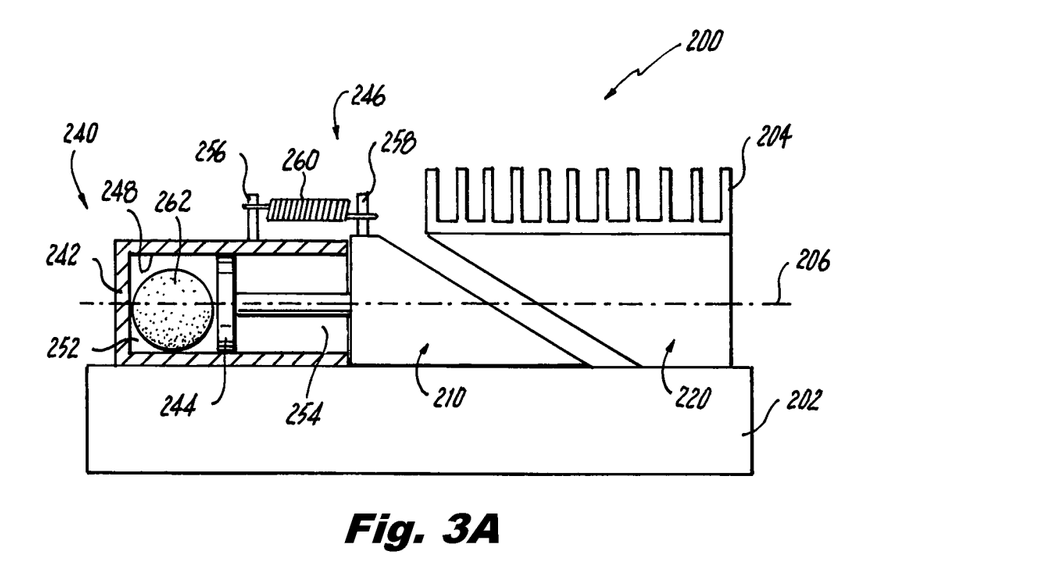
FIG. 3A FIG. 3B are schematic cross-sectional elevation views of another exemplary embodiment of a thermal conductivity control system constructed in accordance with the invention, showing operation of the thermal expansion component of the system.

Referring now to FIG. 3A, a battery system 200 with a first conduction body in a first position. System 200 includes a first conduction body 210, a second conduction body 220, and a thermal expansion component 240. First and second conduction bodies 210 and 220 are similar to bodies 110 and 120 described above, first conduction body 210 being in thermal contact with a battery body 202 and second conduction body 220 being in thermal contact with a heat sink 204. Battery body 220 is configured for storing and supplying electrical power to a vehicle, such as an automobile or an aircraft.

Thermal expansion component 240 is similar to above-described thermal expansion component 140, and is as additionally described below. Thermal component 240 is in thermal contact with battery body 202 such that temperature change within battery body 202 induces corresponding temperature change in thermal component 240. Thermal component 240 includes a fixed element 242, a movable element 244, and a return element 246.

Fixed element 242 of thermal component 240 is a cylinder with an interior surface 248 and an aperture 254. On its distal end, a portion of the cylinder interior surface 248 defines a chamber 252. On its proximate end, cylinder 242 has an aperture 254 defining an avenue to chamber 252. A portion of return element 246 is fixedly coupled to cylinder 242, and cylinder 242 is in thermal contact with battery body 202. Cylinder 242 can be mechanical coupled to battery body 202 by any suitable means such as screws, clamps or fasteners for purpose of providing access to battery body 202 for servicing and/or replacement as appropriate.

Movable component 244 of thermal component 240 is a piston body defining a piston face on a distal end and coupling element on its proximate end. The proximate end of piston 244 operably couples first conduction body 210 and can be any suitable coupling, for example rigid or flexible, such that translation (displacement) of piston 244 along movement axis 206 induces corresponding translation (displacement) of first conduction body 210 along movement axis 206. The piston face of the distal end of piston body 244 cooperates with a portion of cylinder interior 248 to define chamber 252. As would be appreciated, translation of piston body 244 change volume comprised by chamber 252, and volume change of chamber 252 induces translation (displacement) of piston body 244.

Return element 246 of thermal component 240 includes a distal post 256, a proximate post 258, and a resilient member 260 extending distal and proximate posts 256 and 258. Distal post 256 is fixedly coupled to cylinder 242. Proximate post 258 is fixedly coupled to first conduction body 210. Resilient member 260 can be a spring operable to exert a force when extended beyond a predetermined length. As will be appreciated, resilient member 260 is operable to bias first conduction body 210 in distally, thereby urging conduction body 210 towards a first position wherein first conduction body 210 is not in thermal contact with second conduction body 220. As will also be appreciated, other resilient member types and arrangement are possible and with the scope of the invention. For example, resilient member 260 may be spring wound about the periphery of piston 244.

With further reference to FIG. 3A, a thermal expansion body 262 is captive within chamber 252 and in thermal communication with cylinder 242. As illustrated in FIG. 3A, body 262 has a pellet shape. This is for illustrative purposes and non-limiting. Thermal expansion body 262 is a deformable mass in contact with both the portion of cylinder interior 248 defining chamber 252 and the face of piston body 244, and occupies substantially all of the volume of chamber 252. Thermal expansion body 262 further defines the volume of chamber 252, and is constructed of a material that exhibits a significant volumetric expansion at a predetermined temperature, such as paraffin wax for example. Below a predetermined temperature, thermal expansion body 246 defines a first volume of chamber 252. Above the predetermined temperature, thermal expansion body 246 undergoes volumetric expansion, thereby defining a second volume of chamber 252, the second volume being greater than the first volume. In an embodiment, volumetric expansion includes a phase change of the material from which body 262 is constructed, such as from solid to liquid or liquid to gas. As will be appreciated, further temperature increases above the predetermined temperature can cause corresponding increase of the chamber volume defined by thermal expansion body 246. Similarly, further temperature decreases below the predetermined temperature can cause corresponding decrease of the chamber volume defined by thermal expansion body 246. Moreover, as piston body 244 is operable coupled to first conduction body 210 on its proximate end, changes in the volume of chamber 252 operate to displace first conduction body 210 along movement axis 206.

The temperature of battery body 202 influences the position of first conduction body 210 and the position of first conduction body influences the temperature of battery body 202. More specifically, thermal contact of battery body 202 with cylinder 246 causes temperature change in battery body 202 to induce corresponding temperature change in cylinder 246. Thermal contact of cylinder 246 with thermal expansion body 262 in turn causes temperature change of cylinder 246 to induce corresponding temperature change in thermal expansion body 262. When the temperature of thermal expansion body 262 rises above a predetermined temperature, its mass volumetrically expands, thereby urging piston body 244 proximately. Expansion of thermal expansion body 262 can apply proximately directed force that exceeds the biasing force of resilient member 260, at which point thermal expansion body 262 both axially displaces piston body 244 and first conduction body 210 along movement axis 206 and extends resilient member 260. As will appreciated, second conduction body 220 can be arranged along movement axis 206 such that thermal expansion body 262 places first conduction body 210 in thermal contact with second conduction body 220 at and above the predetermined temperature.

Figure 3B:
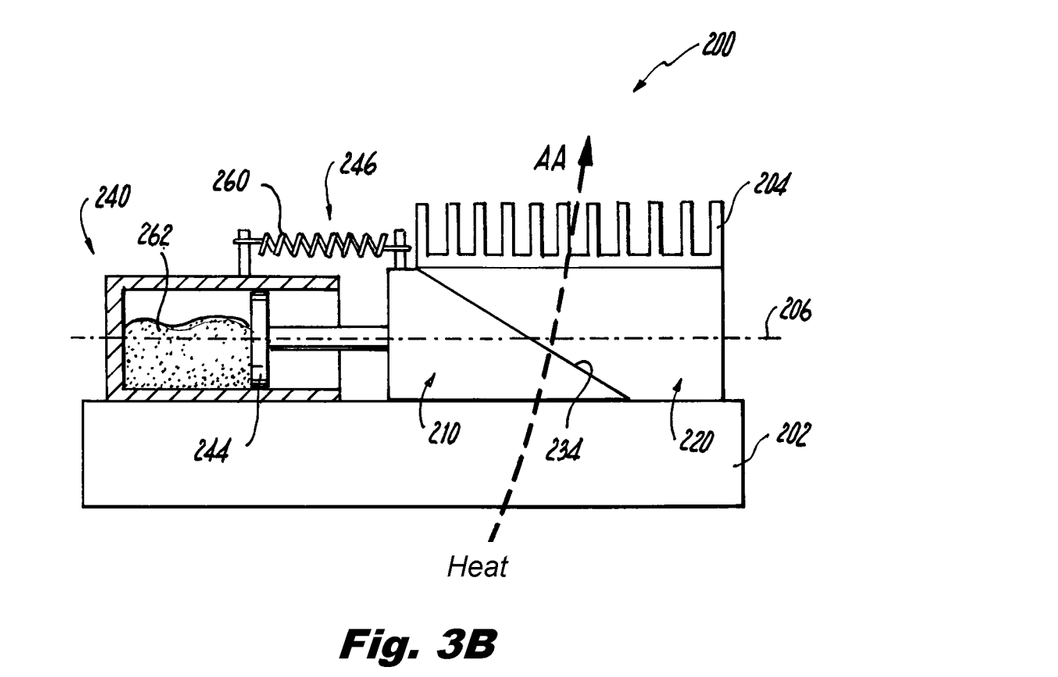

Referring now to FIG. 3B, system 200 is shown with first conduction body 210 in a second position. In the second position first conduction body 210 is in thermal contact with second conduction body 220, and a heat transfer flow AA transfers thermal energy from battery body 202, into first conduction body 210, across an interface 234 between bodies 210 and 220, into second conduction body 220, and thereafter into heat sink 204. Heat sink 204 can thereafter dissipate heat into the environment external a vehicle housing battery body 202. As will be appreciated, heat flow AA can reduce the temperature of battery body 202 such that the temperature of thermal expansion body 262 drops below the predetermined body, thereby causing the volume of thermal expansion body 262 to decrease and reducing the force applied to the face of piston body 244. Once the force applied to the piston face drops below the level of the biasing force of resilient member 260, resilient member 260 displaces piston body 244 and first conduction body distally, thereby translating piston body 244 and first conduction body 210 axially along movement axis 206. This displacement spaces first conduction body 210 apart from second conduction body 220, thereby thermally isolating battery body 202 from heat sink 204.

As will appreciated, system 200 can alternatively cycle between first and second positions as dictated by the temperature adopted by battery body 202 owing to its operation and/or the temperature environment within which the vehicle housing battery body 202 is operated. As will also be appreciated, since the thermal body is a passive actuator, embodiments of the control device described herein do not rely upon other systems for their operation.

The methods and systems of the present invention, as described above and shown in the drawings, provide for thermal conductivity control with superior properties including control of heat path efficiency of a heat conduit connecting a battery body to an environment external to a vehicle housing the battery body. While the apparatus and methods of the subject invention have been shown and described with reference to preferred embodiments, those skilled in the art will readily appreciate that changes and/or modifications may be made thereto without departing from the spirit and scope of the subject invention.

What is claimed is:

1. A system for controlling thermal conductivity between two thermal masses, comprising:
    a first conduction body configured and adapted for thermal contact with a heat source;
    a second conduction body configured and adapted for thermal contact with a heat sink; and
    a thermal expansion component operatively connected to move the first conduction body between a first position in which the first conduction body is spaced apart from the second conduction body for thermal isolation of the heat source and heat sink, and a second position in which the first conduction body is in thermal contact with the second conduction body for conduction of heat from the heat source, through the conduction bodies, and into the heat sink,
    wherein the thermal expansion component is configured and adapted to move the first conduction body into the second position at a predetermined temperature,
    wherein the actuator is a snap disk.

2. The system as recited in claim 1, wherein the first and second positions of the first conduction body define a direction of motion, and wherein the first and second conduction bodies each have a wedge face oblique with respect to the direction of motion.

3. The system as recited in claim 1, wherein the thermal expansion component includes a bimetal actuator fabricated from first and second thermally responsive elements having different thermal coefficient of expansion, first element being coupled second element.

4. The system as recited in claim 1, wherein the snap disk adopts a bowed configuration at the predetermined temperature.

5. The system as recited in claim 1, wherein the wedge face of the first conduction body opposes the wedge face of the second conduction body.

6. The system as recited in claim 1, wherein the wedge faces define a thermally insulating gap between the conduction bodies when the first conduction body is the first position.

7. The system as recited in claim 1, wherein at least one of the wedge faces further comprises a polished surface.

8. The system as recited in claim 1, wherein the wedge faces define a thermally conductive interface between the faces in the second position.

9. The system as recited in claim 7, wherein the thermal expansion component applies a contact pressure along the interface of the wedge faces when the first conduction body is in the second position.

10. The system for controlling thermal conductivity between two thermal masses as recited in claim 1,
    wherein an axis through the first and second position of the first conduction body defines a direction of motion;
    wherein the first and second conduction bodies each have a wedge face that is oblique with respect to the direction of motion; and
    wherein the thermal expansion component is configured to compress the first conduction body against the second conduction body at a second predetermined temperature, thereby increasing a rate of heat transfer between the heat source and the heat sink.

11. A system for controlling thermal conductivity between two thermal masses, comprising:
    a first conduction body configured and adapted for thermal contact with a heat source;
    a second conduction body configured and adapted for thermal contact with a heat sink; and
    a thermal expansion component operatively connected to move the first conduction body between a first position in which the first conduction body is spaced apart from the second conduction body for thermal isolation of the heat source and heat sink, and a second position in which the first conduction body is in thermal contact with the second conduction body for conduction of heat from the heat source, through the conduction bodies, and into the heat sink,
    wherein the thermal expansion component is configured and adapted to move the first conduction body into the second position at a predetermined temperature,
    wherein the thermal expansion component includes a cylinder configured to remain stationary relative to the first conduction body, and a piston body operatively connecting the first conduction body to the cylinder,
    wherein a thermal expansion body within the cylinder operatively connects between the cylinder and the piston for movement of the first conduction body between the first and second positions,
    wherein cylinder contains a fluid having a first coefficient of thermal expansion, wherein a housing of the cylinder is constructed from a material having a second coefficient of thermal expansion, wherein the first coefficient of thermal expansion is greater than the second coefficient of thermal expansion.

12. The system as recited in claim 11, wherein the thermal expansion body includes a paraffin wax pellet.

13. The system as recited in claim 11, further comprising a resilient member biasing the first conduction body towards the first position.

14. A battery system comprising:
    a battery body for storing and supplying electrical energy;
    a first conduction body in thermal contact with the battery body; and a thermal expansion component operatively connected to move the first conduction body between a first position in which the first conduction body is spaced apart from a second conduction body for thermal isolation of the battery from a heat sink in thermal contact with the second conduction body, and a second position in which the first conduction body is in thermal contact with the second conduction body for conduction of heat from the battery body, through the conduction bodies, and into the heat sink, wherein the thermal expansion component is configured and adapted to move the first conduction body into the second position at a predetermined temperature, wherein the thermal expansion component includes a cylinder configured to remain stationary relative to the first conduction body, and a piston body operatively connecting the first conduction body to the cylinder, wherein a thermal expansion body within the cylinder operatively connects between the cylinder and the piston for movement of the first conduction body between the first and second positions, wherein cylinder contains a fluid having a first coefficient of thermal expansion, wherein a housing of the cylinder is constructed from a material having a second coefficient of thermal expansion, wherein the first coefficient of thermal expansion is greater than the second coefficient of thermal expansion.

15. The battery system as recited in claim 14, wherein the heat sink is configured and arranged to be a thermally conductive path to an external surface or other heat sink of an aircraft.

* * * * *